United States Patent [19]

Hara et al.

[11] Patent Number: 5,140,302
[45] Date of Patent: Aug. 18, 1992

[54] VEHICLE DRIVING CONDITION DETECTING APPARATUS

[75] Inventors: Toshiro Hara; Masahiko Sayama, both of Hyogo, Japan

[73] Assignee: Mitsubishi Denki Kabushiki Kaisha, Tokyo, Japan

[21] Appl. No.: 779,165

[22] Filed: Oct. 21, 1991

Related U.S. Application Data

[63] Continuation of Ser. No. 534,613, Jun. 7, 1990, abandoned.

Foreign Application Priority Data

Jun. 8, 1989 [JP] Japan .................. 1-146207

[51] Int. Cl.$^5$ .............................. B60Q 1/00
[52] U.S. Cl. ........................ 340/449; 340/584; 374/183; 374/144; 307/310
[58] Field of Search .......... 340/449, 618, 622, 584; 73/295; 374/144, 183; 307/310

[56] References Cited

U.S. PATENT DOCUMENTS 4,699,520 10/1987 Wallenfang .................. 374/144 X
4,845,469 7/1989 Benda ........................... 340/622 X

OTHER PUBLICATIONS

"Peripheral Circuit", p. 55 of a 1987 Japanese publication on semiconductor sensors.

*Primary Examiner*—Jin F. Ng
*Assistant Examiner*—Jeffery A. Hofsass
*Attorney, Agent, or Firm*—Sughrue, Mion, Zinn, Macpeak and Seas

[57] ABSTRACT

The output of a water temperature sensor is converted into a voltage signal by a first set of resistors. The voltage signal is then converted into a digital signal, which is supplied to a microcomputer for various controls. If the first set of resistors is so set that the voltage change provides optimum representation of temperature variations in a low-temperature range, the measuring accuracy in a high-temperature range becomes degraded. To improve the accuracy in the high-temperature range, the signal from the water temperature sensor is converted into a voltage signal through a second set of resistors—which is optimumly adjusted for the high-temperature range—by turning on a transistor. Thus, the sensor signal-voltage conversion means can be switched between the two conversion characteristics according to whether the temperature being measured is in the low- or high-temperature range, thereby providing high measuring accuracy in a wide range of temperatures.

4 Claims, 5 Drawing Sheets

VEHICLE DRIVING CONDITION DETECTING APPARATUS

This is a continuation of Application Ser. No. 07/534,613 filed Jun. 7, 1990, now abandoned.

BACKGROUND OF THE INVENTION

The present invention relates to an apparatus for detecting the driving condition of a vehicle.

Prior Art

FIG. 8 shows a block diagram of a conventional apparatus, in which reference numeral 1 represents a water temperature sensor made of a thermistor that measures the temperature of a cooling water in the engine. The thermistor changes its resistance as the ambient temperature changes as shown in FIG. 6. The output of the water temperature sensor 1 is fed to a control unit 2 where it is converted by resistors $R_1$, $R_2$ into a voltage as represented by a dotted curve in FIG. 7. Then the voltage thus obtained is converted by an analog-to-digital (A/D) converter $2b$ into a digital signal, which is then supplied to a microcomputer $2a$ as water temperature information. Based on this water temperature information, the microcomputer $2a$ performs various vehicle characteristics controls.

With the conventional apparatus of FIG. 8, when the characteristics of the resistors $R_1$, $R_2$ are so set as to improve the detection accuracy in a low-temperature range, the voltage in a high-temperature range does not change as much as in the low-temperature range in response to the temperature variations as represented by the dotted curve in FIG. 7, i.e., the measuring accuracy in the high-temperature range deteriorates.

To eliminate this problem, two temperature sensors are provided: one $1a$ for the low-temperature range and one $1b$ for the high-temperature range, as shown in FIG. 9. These temperature sensors $1a$, $1b$ are connected with condition-voltage conversion means $R_1$, $R_2$ and $R_{1a}$, $R_{2a}$, respectively. And the outputs of the sensors are then supplied to the microcomputer $2a$ through the A/D converter $2b$. In this configuration, the water temperature information is taken from the water temperature sensor $1a$ when the temperature is in the low-temperature range and, when it is in the high-temperature range, information from the other water-temperature sensor $1b$ is used.

Although the conventional apparatus of FIG. 9 can have high detection accuracy in wide temperature ranges, it requires two sets of water-temperature sensors and condition-voltage conversion means, making the apparatus costly.

This invention has been accomplished to overcome the above drawbacks and its object is to provide an inexpensive vehicle driving condition detecting apparatus which has high detection accuracy in wide ranges of temperature.

SUMMARY OF THE INVENTION

The vehicle driving condition detecting apparatus according to this invention comprises: a means for detecting the driving condition of a vehicle; a condition-voltage conversion means for generating a voltage according to the output of the vehicle driving condition detecting means; an analog-to-digital (A/D) conversion means for converting the output of the condition-voltage conversion means into digital signals; and a means for switching between output characteristics of the condition-voltage conversion means.

With the apparatus of this invention, the output of the vehicle driving condition detecting means is converted into a voltage, which is further converted into a digital signal. Depending on whether or not the digital voltage value is larger than a reference value, one of the condition-voltage conversion characteristics is selected.

DESCRIPTION OF THE PREFERRED EMBODIMENTS

Figure 1:
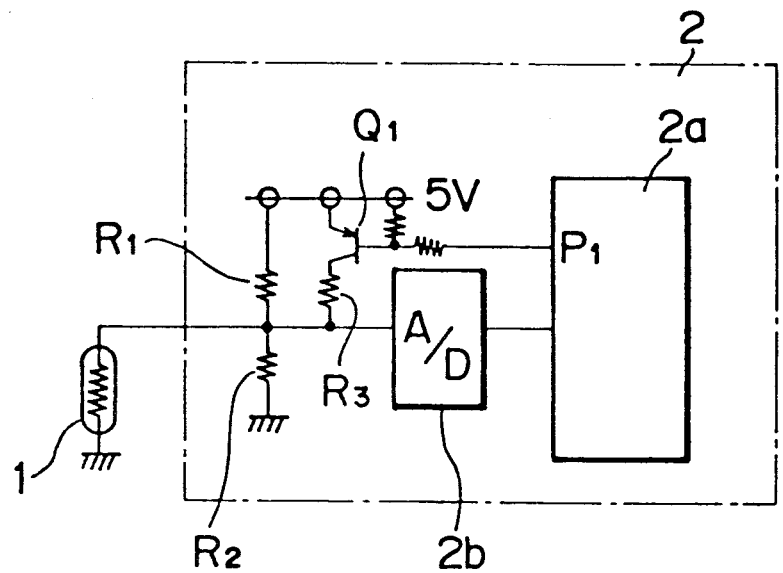
FIGS. 1 and 2 are schematic diagrams showing the circuitry of the first and second embodiment, respectively, of this invention.

Now, some embodiments of this invention will be described by referring to the accompanying drawings. FIG. 1 shows a schematic diagram of the vehicle driving condition detecting apparatus as the first embodiment of this invention. Reference symbol $Q_1$ denotes a transistor, and $R_3$ a resistor. A series circuit of the transistor $Q_1$ and the resistor $R_3$ is connected in parallel with a resistor $R_1$. The base of the transistor $Q_1$ is supplied with a signal from an output port $P_1$ of the microcomputer $2a$.

Figure 3:
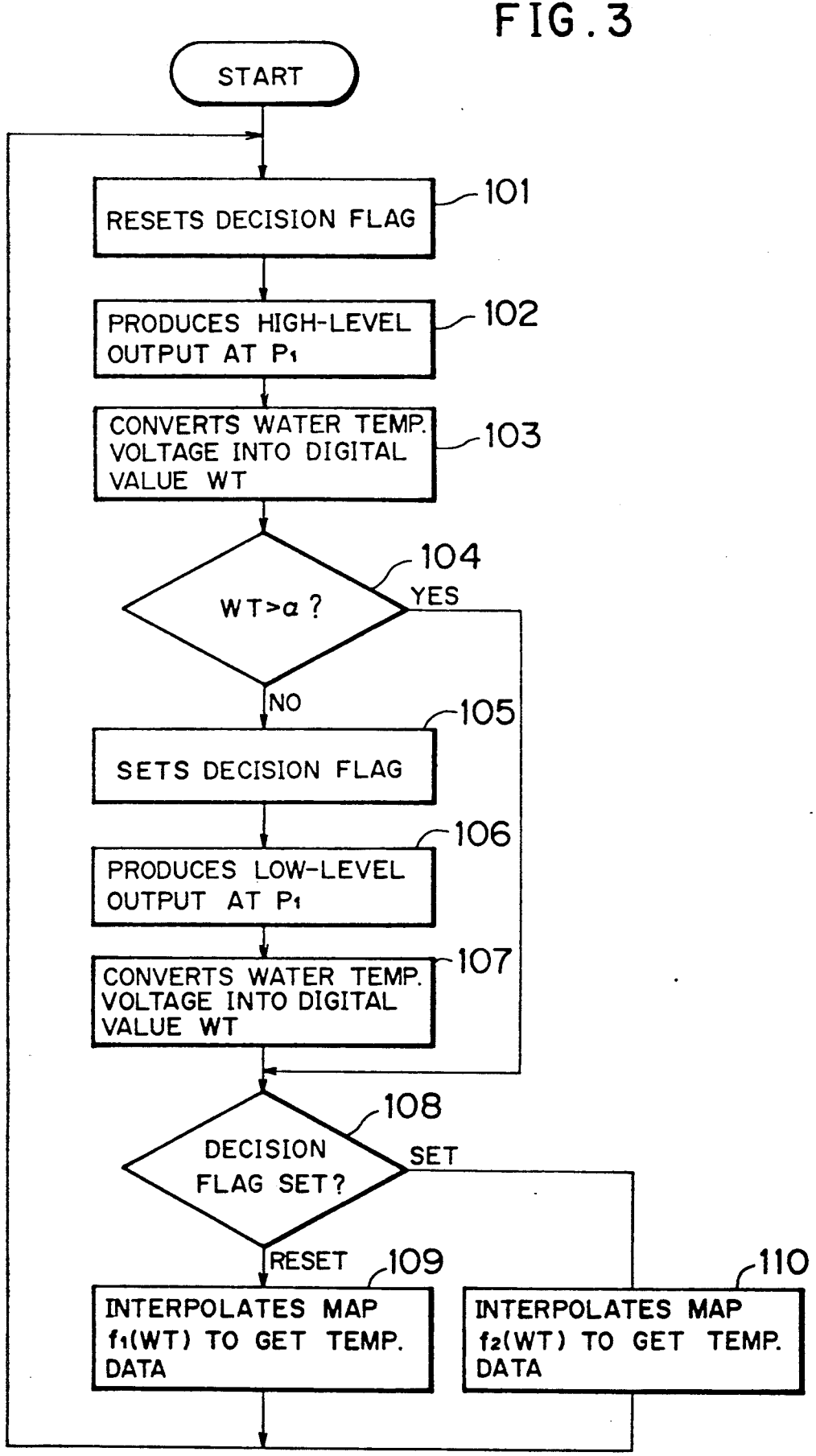
FIG. 3 is a flowchart showing the sequence of operations as performed by the first embodiment.
Figure 7:
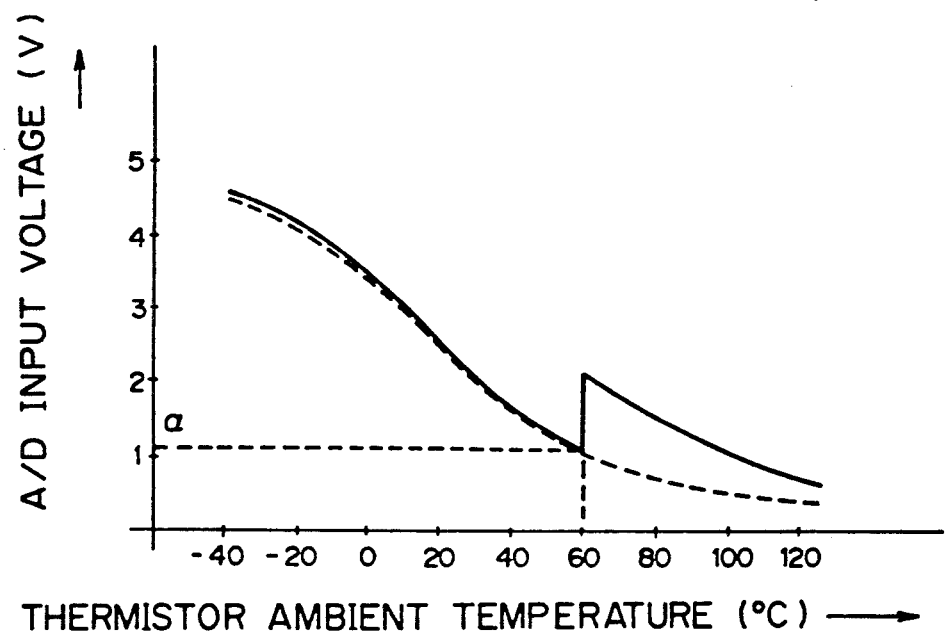
FIG. 7 is a diagram showing the relationship between the thermistor ambient temperature and the input voltage of A/D converter.
Figure 8:
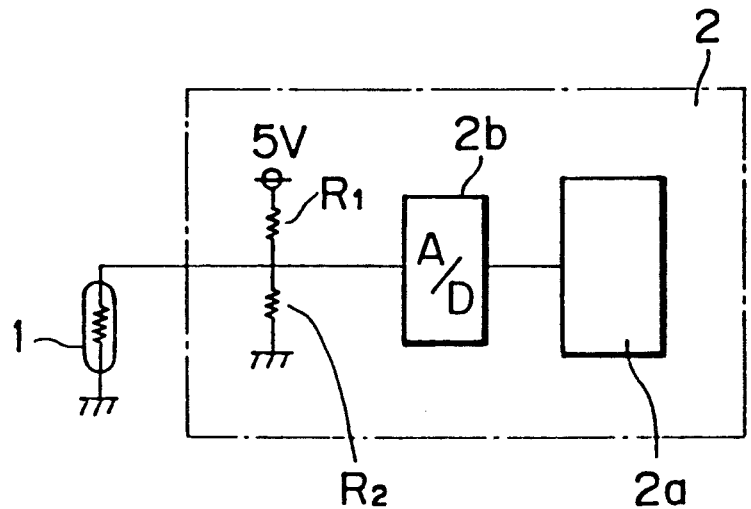
FIGS. 8 and 9 are schematic diagrams showing the circuitry of conventional apparatuses.
Figure 9:
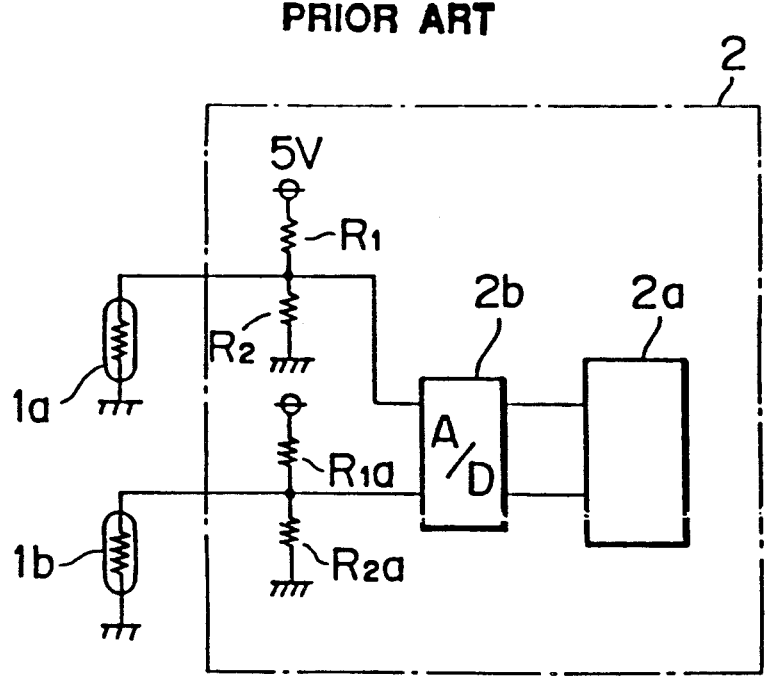

The operation of the above embodiment will be explained by referring to the flowchart of FIG. 3. The control unit, 2 turns on when a power supply unit not shown, is energized. The microcomputer $2a$ performs the following processing. At step 101 the microcomputer $2a$ resets a decision flag and, at step 102, holds the signal at its output port $P_1$ high. This high-level signal turns off the transistor $Q_1$ so that the output of the water temperature sensor I is converted into a voltage through resistors $R_1$, $R_2$. This voltage is then converted at step 103 by an analog-to-digital (A/D) converter $2b$ into a digital signal, which is stored in memory as a voltage value WT. At step 104 the microcomputer $2a$ compares the detected voltage WT with a reference value $a$ (e.g., a value corresponding to 60° C. of FIG. 7) and, if WT>$a$ (i.e., the water temperature is lower than 60° C.), it is decided that the detection accuracy is good. Then the microcomputer proceeds to a step 108.

If it is found that WT<$a$, meaning that the water temperature is higher than 60° C., it is decided that the detecting accuracy is not good. The microcomputer then sets the decision flag at step 105 and produces a low-level signal at the output port $P_1$ at step 106 to turn on the transistor $Q_1$. This causes the output of the water temperature sensor 1 to be converted through resistors $R_1$, $R_2$ and $R_3$ into a voltage, which at step 107 is converted into a digital signal. This voltage is represented by a solid curve in FIG. 7, which shows greater variations in response to temperature changes, thus providing improved accuracy for the temperature range higher than 60° C.

Figure 4:
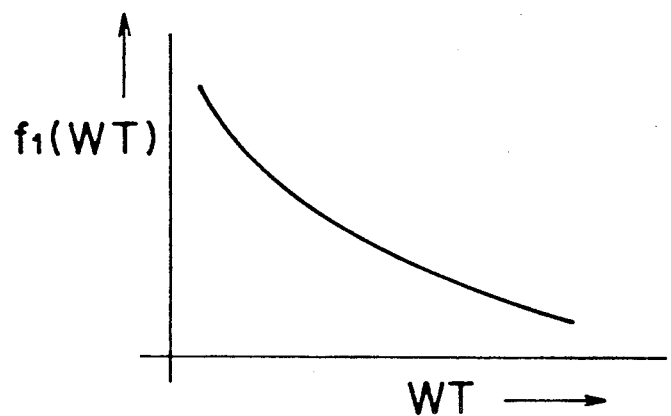
FIGS. 4 and 5 are data maps for converting the digital voltage into temperature data.
Figure 5:
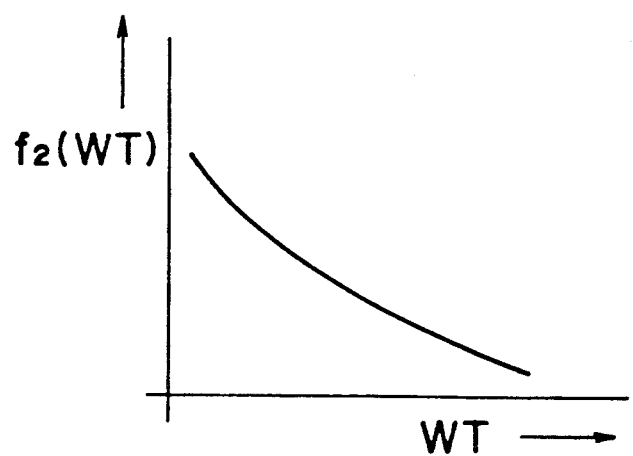
Figure 6:
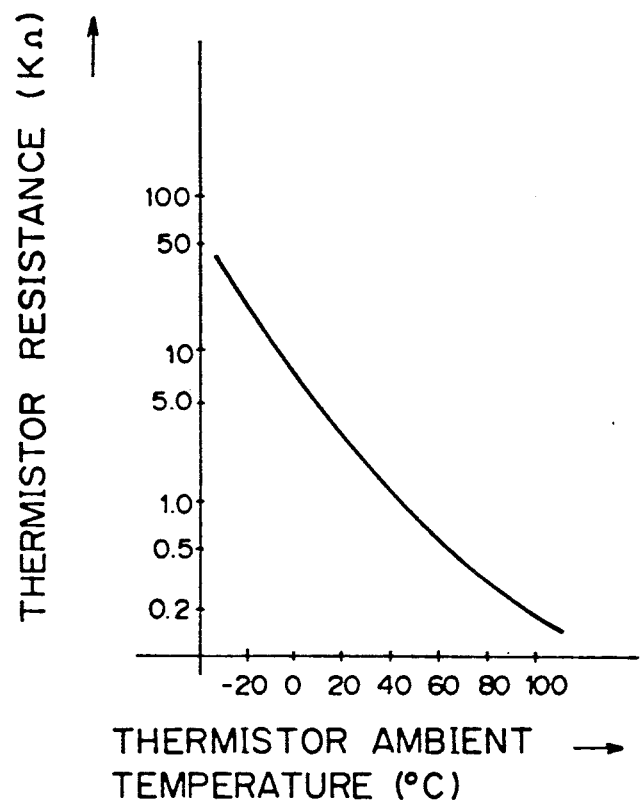
FIG. 6 is a diagram showing the characteristic of the thermistor.

At step 108, it is checked whether the decision flag is set or reset. If it is found that the flag is reset, i.e., the water temperature is lower than 60° C., the next step 109 selects a data map f$_1$(WT) of FIG. 4 and performs an interpolation operation to convert the voltage data into the temperature data. If the decision flag is found to be set, i.e., the water temperature is higher than 60° C., the microcomputer 2a chooses a data map f$_2$(WT) of FIG. 5 at step 110 and performs interpolation on the voltage data to obtain the corresponding temperature data. These temperature data are used for fuel injection control and ignition timing control.

In the above embodiment, the condition-voltage conversion means is switched between two different conversion characteristics depending on whether or not the water temperature is higher than the reference temperature, in order to provide high detecting accuracy in a wide range of temperatures. While the above embodiment is provided with a resistor R$_2$, it may be omitted. The resistors R$_1$, R$_2$ in the embodiment are set so that high measuring accuracy is obtained in the low-temperature range, but it is also possible to set them in an optimum condition for the high-temperature range and turn on the transistor Q$_1$ in the low-temperature range.

Figure 2:
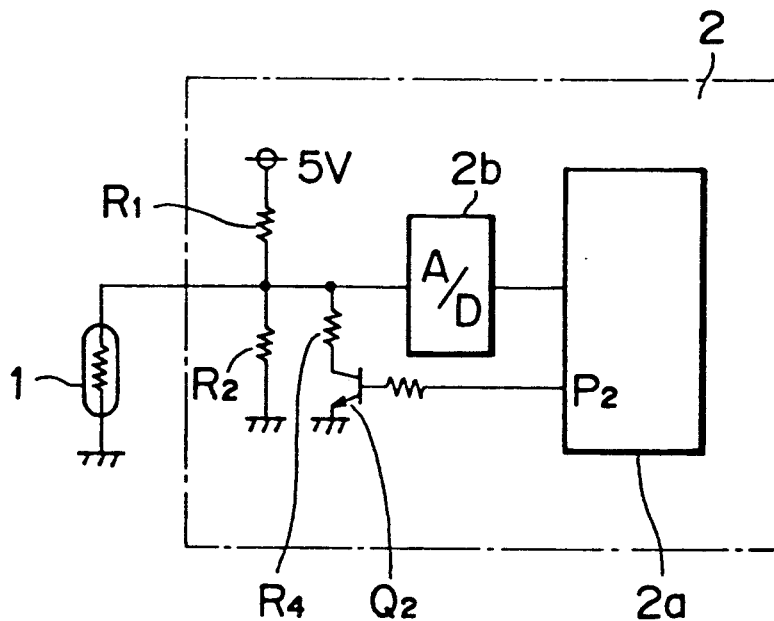

FIG. 2 shows a second embodiment of this invention, in which a series circuit made up of a transistor Q$_2$ and a resistor R$_4$, instead of the transistor Q$_1$ and the resistor R$_3$, is connected in parallel with the resistor R$_2$. The base of the transistor Q$_2$ is supplied with a signal from the output port P$_2$ of the microcomputer 2a. The other aspects of the second embodiment are similar to the first embodiment except that the level of the signal output from the port P$_2$ is reverse to that from port P$_1$. And the two embodiments perform the same function.

While the above embodiments measure the temperature of the engine cooling water, this invention can also be applied to measuring other operating conditions of the vehicle.

This invention may be summarized as follows. The output of the driving condition detecting means is converted into a voltage, which is further A/D-converted. Depending on whether or not the digitized voltage value is higher than a reference value, the output characteristic of the driving condition-voltage conversion means is switched between two preset characteristics. In a driving condition range where the detecting accuracy deteriorates, the condition-voltage conversion characteristic is changed to ensure high detection accuracy. This ensures a high level of detection accuracy over a wide range of driving conditions. Furthermore, only one set of the driving condition detecting means and the condition-voltage conversion means is needed, reducing the cost of manufacture.

What is claimed is:

1. A vehicle driving condition detecting apparatus, comprising:
    a) a single analog sensing element for detecting a driving condition of a vehicle;
    b) a single condition-voltage conversion means for generating an analog voltage corresponding to an output of the vehicle driving condition sensing element;
    c) an analog-digital conversion means directly coupled to an output of the condition-voltage conversion means for converting said analog voltage into a digital signal in a real time manner;
    d) an output characteristic modification means, including a switching element, connected to the condition-voltage conversion means for selectively modifying an output characteristic thereof;
    e) means including a comparator for determining whether or not said digital signal is larger than a predetermined, constant magnitude reference value; and
    f) means for actuating said switching element in response to an output of said determining means to control said output characteristic modification means in a manner to maximize the response sensitivity of the condition-voltage conversion means and attendantly that of the driving condition detecting apparatus,
    g) wherein said output characteristic of the condition-voltage conversion means is modified by switching between two non-linear condition-voltage response curves such that, within a sensed condition range, a selected one of said curves having a steepest gradient is utilized.

2. A vehicle driving condition detecting apparatus as claimed in claim 1, wherein said sensing element detects the cooling water temperature in an engine.

3. A vehicle driving condition detecting apparatus as claimed in claim 1, wherein:
    a) the condition-voltage conversion means comprises a voltage divider, and
    b) the output characteristic modification means comprises a series circuit of said switching element and an impedance connected in parallel with a portion of said voltage divider.

4. A vehicle driving condition detecting apparatus as claimed in claim 3, wherein the output of the sensing element is connected to an intermediate junction of the voltage divider.